H. A. DALLEY.
SHOCK ABSORBER FOR VEHICLES.
APPLICATION FILED DEC. 18, 1911.

1,046,989.

Patented Dec. 10, 1912.

2 SHEETS—SHEET 1.

Witnesses
W. May Duvall.
Byron B. Collings.

Inventor
H. A. Dalley,
by Wilkinson, Fisher & Watherston
his Attorneys.

H. A. DALLEY.
SHOCK ABSORBER FOR VEHICLES.
APPLICATION FILED DEC. 18, 1911.

1,046,989.

Patented Dec. 10, 1912.

2 SHEETS—SHEET 2.

Witnesses
W. May Duvall.
Byron B. Collings.

Inventor
H. A. Dalley,
by Wilkinson, Fisher & Witherspoon
his Attorneys

UNITED STATES PATENT OFFICE.

HENRY ALLEN DALLEY, OF ARDMORE, PENNSYLVANIA.

SHOCK-ABSORBER FOR VEHICLES.

1,046,989.  Specification of Letters Patent.  Patented Dec. 10, 1912.

Application filed December 18, 1911. Serial No. 666,472.

*To all whom it may concern:*

Be it known that I, HENRY ALLEN DALLEY, a citizen of the United States, residing at Ardmore, in the county of Montgomery and State of Pennsylvania, have invented certain new and useful Improvements in Shock-Absorbers for Vehicles; and I do hereby declare the following to be a full, clear, and exact description of the invention, such as will enable others skilled in the art to which it appertains to make and use the same.

My invention relates to an improved shock absorber for vehicles, and it consists in the constructions, combinations and arrangements hereinafter described and claimed.

An object of my invention is to provide an improved shock absorber adapted to eliminate all excessive and injurious shocks and jars, thereby providing a steady riding vehicle and minimizing tire wear.

A further object of my invention is to provide a strong and compact shock absorber adapted for ready use with standard types of spring-suspended vehicles, which will relieve the spring-suspension from abnormal stress, and constitute an efficient buffer for preventing troublesome rebound of the said gear under all practical conditions.

Figure 1:
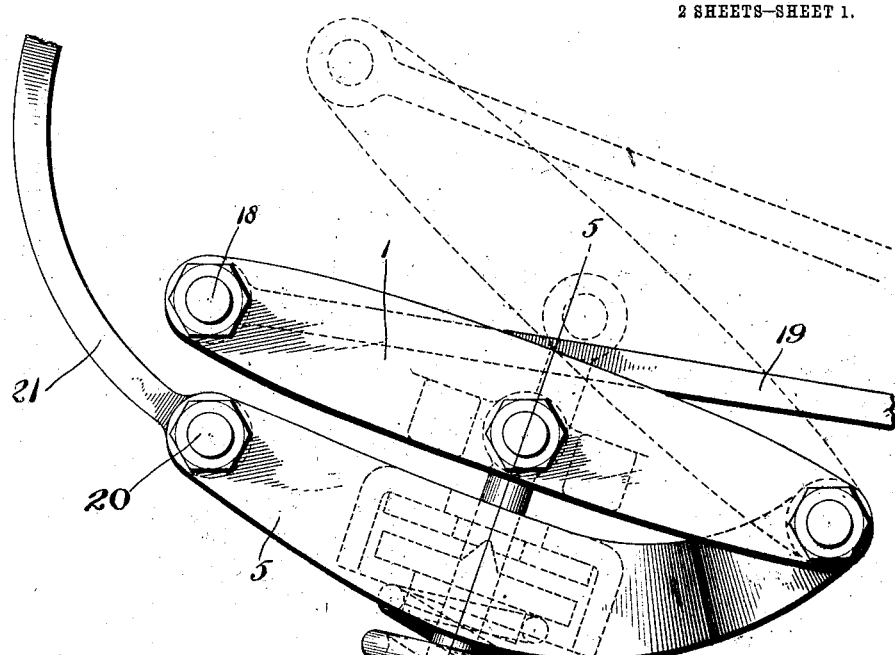
Figure 2:
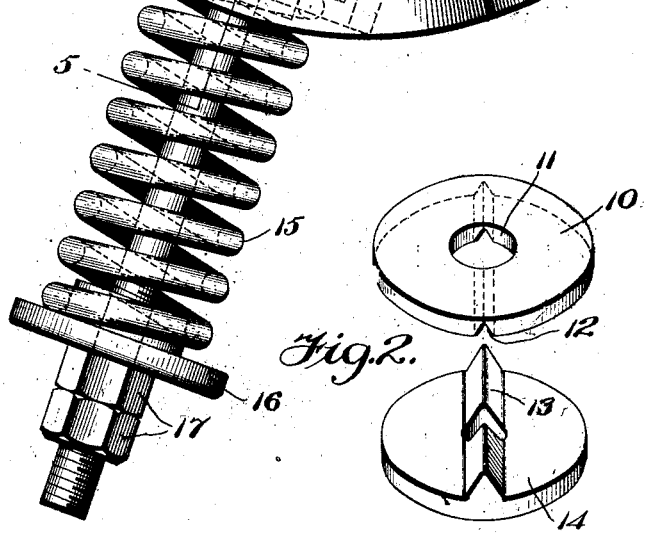
Figure 3:
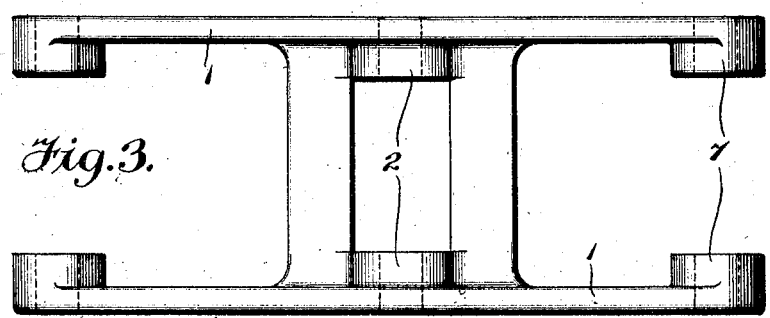
Figure 4:
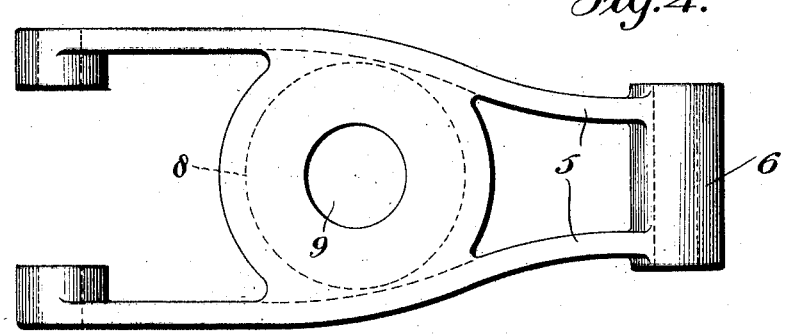
Figure 5:
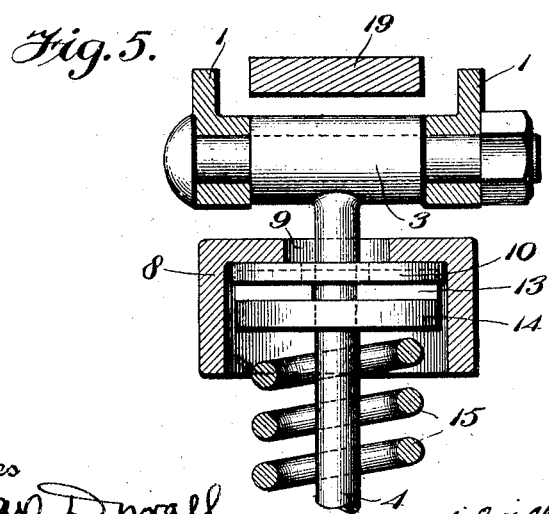

In the accompanying drawings forming a part of this application and in which corresponding reference symbols indicate similar parts in the several views:—Figure 1 is an elevation, illustrating one embodiment of my invention; Fig. 2 is a perspective view of the bearing disk and its engaging seat shown in Fig. 1; Fig. 3 is a plan of the upper open link; Fig. 4 is a similar view of the bifurcated lower link; and, Fig. 5 is a detail section on the line 5—5 of Fig. 1.

Referring to the drawings:—1 indicates the legs of an open link provided with a bearing 2 in which is pivotally mounted the head 3 of a tension rod 4. A lower link 5 is provided with a head 6 pivotally connected to the end 7 of the said link 1, and provided with a cup 8 having an axial opening 9 through which said rod 4 passes loosely for a free swinging motion. A bearing disk 10 is loosely seated in said cup 8 and provided with an opening 11 for loosely receiving said rod 4 and with a groove 12 for rockingly receiving the knife edge 13 of a seat 14. A spiral spring 15 is confined under tension between said seat 14 and a stop 16 adjustably mounted on the rod 4 by nuts 17; said spring constituting an adjustable, resilient means tending to maintain the links 1 and 5 in closed position, and to yieldingly resist relative swing of said links about their pivotal connection. The free end of the link 1 is pivoted at 18 to any usual type of axle spring, such as a leaf spring 19 secured in the usual manner to the axle. The free end of the lower link 5 is pivotally connected at 20 to either a spring or a bracket 21 secured to the vehicle body.

It will be noted that in my improved construction the shock absorbing device is adapted to be inserted in series in any usual spring suspension gear, and that the forces are applied thereto in such manner that the spiral compensating spring 15 has an initial tension greater than that of the axle spring 19. This provides an efficient construction adapted to relieve the parts from excessive shocks and strains under all practical conditions.

I have illustrated preferred and satisfactory construction, but changes could be made within the spirit and scope of my invention.

I claim:—

1. A shock absorber for spring-suspended vehicles, comprising a pair of links pivoted together at one end, means for pivotally connecting the free ends of said pivoted links to the vehicle body and axle spring respectively, a rod pivoted to one of said links, and a spring confined on said rod against the other of said links.

2. A shock absorber for spring-suspended vehicles, comprising a pair of links pivoted together at one end, means for pivotally connecting the free ends of said pivoted links to the vehicle body and axle spring respectively, a rod pivoted to one of said links, an adjustable stop on said rod, a seat slidably mounted on said rod for engaging the other of said links, and a spring confined between said stop and seat.

In testimony whereof, I affix my signature, in presence of two witnesses.

HENRY ALLEN DALLEY.

Witnesses:
WM. P. LANDES,
LOUISE H. KAIN.